United States Patent Office 3,733,333
Patented May 15, 1973

3,733,333
SUBSTITUTED 1 - AMINO 4,9 - DIHYDRO-3H-PYRIDO[3,4-b]INDOLES AND PROCESS FOR THEIR PREPARATION
Otto Behner and Walter Puls, Wuppertal-Elberfeld, Germany, assignors to Bayer Aktiengesellschaft, Leverkusen, Germany
No Drawing. Filed Apr. 27, 1971, Ser. No. 137,991
Claims priority, application Germany, May 2, 1970,
P 20 21 519.4
Int. Cl. C07d 31/42
U.S. Cl. 260—296 A      15 Claims

ABSTRACT OF THE DISCLOSURE 4,9-dihydro-3H-pyrido[3,4-b]indoles bearing a substituted amino group in the 1-position and their salts possess antihyperglycemic properties. The compounds are prepared through treatment of certain reactive derivatives of 1-oxo-2,3,4,9-tetrahydro-1H-pyrido[3,4-b]indoles with an amine or through cyclization of an appropriately substituted 3-(2-ureidoethyl)-indole or the corresponding thioureido compound. A typical embodiment is 1-(3,5-dimethylpyrazol-4-ylamino) - 4,9 - dihydro-3H-pyrido[3,4-b]indole.

DETAILED DESCRIPTION

The present invention pertains to substituted derivatives of 1-amino-4,9-dihydro-3H-pyrido[3,4-b]indoles and salts thereof, to processes for their preparation, to their pharmaceutical use as antihyperglycemic agents and to pharmaceutical compositions for this use.

In particular, the present invention pertains to compounds of the formula:

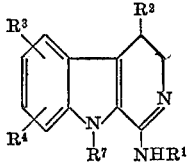

(I)

wherein $R^1$ is a phenyl, pyridyl, pyrazolyl or isoxazolyl group, the phenyl and pyridyl groups being unsubstituted or substituted by lower alkyl, lower alkoxy, lower alkylmercapto or halogeno and pyrazolyl and isoxazolyl groups being unsubstituted or substituted by at least one lower alkyl or aryl;
$R^2$ is hydrogen, methyl or ethyl;
each of $R^3$ and $R^4$ independent of the other, is hydrogen, lower alkyl, lower alkoxy, lower alkylmercapto or halogeno; and
$R^7$ is hydrogen or lower alkyl.

The present invention also pertains to the pharmaceutically acceptable acid addition salts of the above compounds.

By the term lower alkyl and derivations thereof such as lower alkoxy and lower alkylmercapto is intended a straight or branched hydrocarbon chain of from 1 to 6 carbon atoms, namely such as methyl, ethyl, propyl, isopropyl, butyl, t-butyl, sec.-butyl, pentyl, hexyl and the like. Preferably, such lower alkyl groups will contain from 1 to 3 carbon atoms inclusively. Aryl is preferably phenyl.

As is described in greater detail hereafter, the compounds of the present invention possess strong antihyperglycemic activity and are thus useful in the treatment of conditions characterized by abnormally high blood sugar levels.

Compounds are prepared according to the present invention through (a) Treating an acid halide addition salt of a compound of the formula:

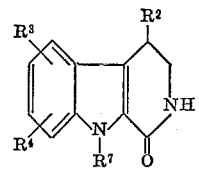

(II)

wherein $R^2$, $R^3$, $R^4$ and $R^7$ are as herein defined, with an amine of the formula

wherein $R^1$ is as herein defined (b) Treating a compound of the formula:

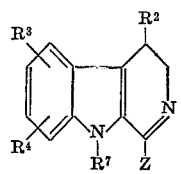

(III)

wherein $R^2$, $R^3$, $R^4$ and $R^7$ are as herein defined and Z is lower alkoxy, lower alkylmercapto, aryloxy aliphatic or aromatic sulfonyloxy such as lower alkylsulfonyloxy or phenysulfonyloxy, or halogeno, or a salt thereof with a strong acid, with an amine of the formula:

where $R^1$ is as herein defined, or (c) Cyclizing a compound of the formula:

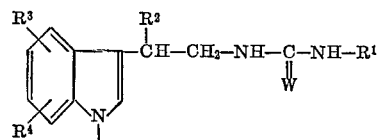

(IV)

wherein $R^2$, $R^3$, $R^4$ and $R^7$ are as herein defined and W is an oxygen or sulfur atom with an acidic dehydrating agent or when W is a sulfur atom, with a desulfurizing agent, and (d) When desired forming the acid addition salt of the compound so obtained.

In the first embodiment described above, the acid halide addition salt of the α-keto-dihydro-β-carboline is obtained through treatment of the latter with appropriate inorganic or organic acid halides such as phosphorous oxychloride, phosphorus oxybromide, phosphorus pentachloride, phosphorus pentabromide, phosphorus trichloride, phosphorus tribromide, thionyl chloride, thionyl bromide, phosgene, oxalyl chloride and the like, thereby generating a reactive intermediate of the structure.

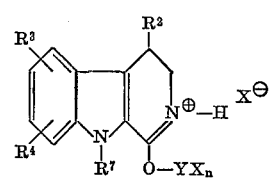

(V)

in which

Y is PO, P, SO, CO, or COCO,
X is halogeno,
n has a value of from 1 to 4, and
$R^2$, $R^3$, $R^4$ and $R^7$ are as defined above.

In the second embodiment described above, a lactim-ether-lactim-thioether, lactim-ester or lactim-halide, or a salt thereof, of Formula III is treated with an amine of the formula:

$$H_2N-R^1$$

Preferably, these derivatives of Formula III are employed in the form of a salt with a strong acid such as a hydrohalogenic acid or tetraflouroboric acid.

Suitable amines for utilization in either of these two embodiments include: aniline, 2-toluidine, 3-toluidine, 4-toluidine, 2,3-xylidine, 2,4-xylidine, 2,5-xylidine, 2,6-xylidine, 3,4-xylidine, 3,5-zylidine, 2-chloroaniline, 3-chloroaniline, 4-chloroaniline, 2,3-dichloroaniline, 2,4-dichloroaniline, 2,5-dichloroaniline, 2,6-dichloroaniline, 6-chloro-2-toluidine, 5-chloro-2-toluidine, 4-chloro-2-toluidine, 2-ethylaniline, 2-propylaniline, 2-anisidine, 4-anisidine, 2-ethoxyaniline, 2-bromoaniline, 2-fluoroaniline, 2-methylmercaptoaniline, 2-aminopyridine, 3-aminopyridine, 4-aminopyridine, 2-amino-β-picoline, 3-amino-α-picoline, 3-amino-γ-picoline, 4-aminopyrazole, 4-amino-3(5)-methylpyrazole, 4-amino-3(5)-ethylpyrazole, 4-amino-3(5)-propyl-pyrazole, 4-amino-3,5-dimethyl-pyrazole, 4-amino-3(5)-methyl-5(3)-ethyl-pyrazole, 4-amino-3,5-diethyl-pyrazole, 4-amino-1,3,5-trimethyl-pyrazole, 4-amino-3,5-dimethyl-isoxazole and 5-amino-4-methyl-1-phenyl-pyrazole.

The 4,9-dihydro-3H-pyrido[3,4-b]indole employed as the other reactant in these two embodiments can be prepared by methods known to the art; e.g. Henecka et al., Medizin und Chemie, Vol. VII, pp. 277–286, Verlag Chemie 1963; Benson et al., J. Am. Chem. Soc. 70, 2117 (1948); Meerwein et al., Chem. Ber. 89, 2063 (1956); and Oxley et al., J. Chem. Soc. (London) 1948, 1619. Typical 1-oxo-2,3,4,9-tetrahydro-1H-pyrido[3,4-b]indoles which may be employed include:

4-methyl-α-keto-dihydro-β-carboline,
5-methyl-α-keto-dihydro-β-carboline,
6-methyl-α-keto-dihydro-β-carboline,
7-methyl-α-keto-dihydro-β-carboline,
8-methyl-α-keto-dihydro-β-carboline,
9-methyl-α-keto-dihydro-β-carboline,
4,9-dimethyl-α-keto-dihydro-β-carboline,
5,9-dimethyl-α-keto-dihydro-β-carboline,
6,9-dimethyl-α-keto-dihydro-β-carboline,
7,9-dimethyl-α-keto-dihydro-β-carboline,
8,9-dimethyl-α-keto-dihydro-β-carboline,
5,7-dimethyl-α-keto-dihydro-β-carboline,
6,8-dimethyl-α-keto-dihydro-β-carboline,
5,7,9-trimethyl-α-keto-dihydro-β-carboline,
6,8,9-trimethyl-α-keto-dihydro-β-carboline,
4-propyl-α-keto-dihydro-β-carboline,
6-ethyl-α-keto-dihydro-β-carboline,
9-ethyl-α-keto-dihydro-β-carboline,
6-propyl-α-keto-dihydro-β-carboline,
6-isopropyl-α-keto-dihydro-β-carboline,
6-methoxy-α-keto-dihydro-β-carboline,
7-methoxy-α-keto-dihydro-β-carboline,
8-methoxy-α-keto-dihydro-β-carboline,
6-ethoxy-α-keto-dihydro-β-carboline,
6-propoxy-α-keto-dihydro-β-carboline,
6-fluoro-α-keto-dihydro-β-carboline,
8-fluoro-α-keto-dihydro-β-carboline,
6-chloro-α-keto-dihydro-β-carboline,
8-chloro-α-keto-dihydro-β-carboline,
6-bromo-α-keto-dihydro-β-carboline,
5-chloro-7-methyl-α-keto-dihydro-β-carboline,
7-chloro-5-methyl-α-keto-dihydro-β-carboline,
6-chloro-8-methyl-α-keto-dihydro-β-carboline,
8-chloro-6-methyl-α-keto-dihydro-β-carboline and
6-methylmercapto-α-keto-dihydro-β-carboline.

In the third embodiment described above, in which a urea or thiourea is cyclized, the cyclization may be performed with an acidic dehydrating agent such as phosphorus oxychloride or aluminum chloride, or with a desulfurizing agent shown as mercuric oxide or mercuric chloride.

The above reactions are preferably executed in an inert organic or inorganic solvent, although the use of a solvent is not absolutely essential. When a solvent is employed, it can be hydrocarbon such as ligroin and benzene; an ether such as diethyl ether or tetrahydrofuran; a halogenated hydrocarbon such as chloroform or chlorobenzene; a sulfoxide such as dimethylsulfoxide; a sulfone such as tetramethylenesulfone; an alcohol such as methanol, or water. These solvents can be used individually or as mixtures.

The temperature is not critical and may range from about 0° to about 150°, preferably from about 35° to about 100° C.

The 1-amino-4,9-dihydro-3H-pyrido[3,4-b]indoles of the present invention and their pharmaceutically acceptable salts exhibit strong antihyperglycemic activity. Thus, they possess the ability to prevent a sharp increase in the glucose concentration of the blood after oral administration of glucose. In doing so, they are free of certain side effects associated with known agents of this type, such as biguanides. For example, the present compounds do not effect a rise in the lactic acid concentration in the blood, an undesirable side effect associated with biguanides. This antihyperglycemic action can be conveniently observed in the following in vivo model.

Fasting rats are repeatedly given the active substance orally, and glycose in physiological sodium chloride solution is then orally administered to them. The blood glucose level of the treated animals rises less markedly as a function of the dose than it does in the case of the untreated animals. The measurement is carried out 30 and/or 60 minutes after the administration of glucose. The dose quoted in Table 1 is, in each case, that which effects a significant ($p<0.05$) reduction in hyperglycemia after administration of glucose, as compared to the untreated control group.

Table 1

| Compound: | Single dose mg./kg. |
|---|---|
| 1-(3,5-dimethylpyrazol-4-ylamino)-4,9-dihydro-3H-pyrido[3,4-b]indole | 5 |
| 1-(3,5-diethylpyrazol-4-ylamino)-4,9-dihydro-3H-pyrido[3,4-b]indole | 10 |
| 1-(3-ethyl-5-methylpyrazol-4-ylamino)-4,9-dihydro-3H-pyrido[3,4-b]indole | 5 |
| 1-(2,6-xylidino)-6-methoxy-4,9-dihydro-3H-pyrido[3,4-b]indole | 10 |
| 1-(3,5-dimethylpyrazol-4-ylamino)-6-methyl-4,9-dihydro-3H-pyrido[3,4-b]indole | 10 |
| 1-(1,3,5-trimethylpyrazol-4-ylamino)-6-methyl-4,9-dihydro-3H-pyrido[3,4-b]indole | 10 |
| 1-(3-ethyl-5-methylpyrazol-4-ylamino)-6-methyl-4,9-dihydro-3H-pyrido[3,4-b]indole | 10 |
| 1-(3,5-dimethylpyrazol-4-ylamino)-4-methyl-4,9-dihydro-3H-pyrido[3,4-b]indole | 10 |
| 1-(3-ethyl-5-methylpyrazol-4-ylamino)-4-methyl-4,9-dihydro-3H-pyrido[3,4-b]indole | 10 |
| 1-(2,6-xylidino)-9-methyl-4,9-dihydro-3H-pyrido[3,4-b]indole | 10 |

In accordance with the present invention, these substituted 1-amino-4,9-dihydro-3H-pyrido[3,4-b]indoles can be utilized in the preparation of antihyperglycemic pharmaceutical compositions through admixture of at least one of these compounds, or pharmaceutically acceptable salt thereof, with a pharmaceutically acceptable solid or liquid carrier.

In the present specification the expression "pharmaceutically acceptable carrier" refers to a non-toxic substance which when mixed with a substituted 1-amino-4,9-dihydro-3H-pyrido[3,4-b]indole of the present invention renders it more suitable for administration. The expression preferably excludes water and low-molecular weight organic solvents commonly used in chemical synthesis, except in the presence of other pharmaceutically ingredients such as salts in correct quantities to render the composition isotonic, buffers, surfactants, coloring and flavoring agents, and preservatives. Examples of suitable liquid carriers thus include vegetable oils, polyols, buffered aqueous solutions, isotonic saline aqueous solutions, syrups, bases and the like.

Preferred pharmaceutical compositions of the invention are those adapted for oral administration. The carriers used are preferably therefore those that adapt the active ingredient or ingredients for oral administration such as glucose, lactose, sucrose, corn starch, potato starch, sodium carboxymethylcellulose ethylcellulose, cellulose acetate, powdered gun tragacanth, gelatin, alginic acid, agar, stearic acid and sodium, calcium and magnesium stearates, sodium lauryl sulphate, polyvinylpyrrolidone, sodium citrate, calcium carbonate, dicalcium phosphate and the like. The compositions may also contain other non-toxic adjuvants and modifiers such as dyes, surfactants, perfumes, flavoring agents, preservatives and biocides. These pharmaceutical compositions of the invention preferably contain as active ingredient 1 to 90 wt. percent of a substituted 1-amino-4,9-dihydro-3H-pyrido[3,4-b]indole, or pharmaceutically acceptable salt thereof.

The present invention also provides medicaments in unit dosage form comprising as an active ingredient at least one substituted 1-amino-4,9-dihydro-3H-pyrido[3,4 - b]indole, a pharmaceutically acceptable salt thereof, either alone or in admixture with a pharmaceutically acceptable solid or liquid carrier. The carrier is as defined above and can also be water or another common solvent.

The expression "medicament in unit dosage form" as used in the present specification means a medicament in the form of discrete portions each containing a unit dose or a multiple or sub-multiple of a unit dose of the active ingredient; for example, one, two, three or four unit doses or a half, a third or a quarter of a unit dose. A "unit dose" is the amount of the active ingredient to be administered on one occasion in a dosage regimen and will usually be a daily dose, or a half, a third, or a quater of a daily dose, depending on whether the medicament is to be administered once or, for example, twice, three times, or four times a day.

The discrete portions constituting the medicament in unit dosage form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragées; in wrapped or concealed form, the active ingredient being within a protective envelope, such as wrapped powders, cachets, sachets, capsules, or ampoules; or in the form of a sterile solution suitable for parenteral injection, such as ampoules of buffered isotonic, sterile, pyrogen-free aqueous solution; or in any other form known in the art.

As stated above, it is preferred to administer the new compounds of general Formula I of their pharmaceutically acceptable salts perorally. Preferred medicaments in unit dosage form according to the invention are, therefore, those adapted for oral administration, such as tablets, pills, dragées, capsules, and cachets, as well as wrapped powders containing the active ingredient in powdered form with a powdered diluent or carrier for suspension in water before being taken.

The preferred unit dose for administration of the medicaments of the invention will contain 1 to 100 mg. of active ingredient. This will normally be administered 1 to 5 times daily.

The following examples will serve to further illustrate this invention but should not be construed as a limitation on the scope thereof.

EXAMPLE 1

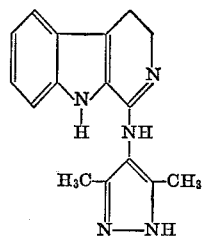

The complex obtained from 15 g. of 1-oxo-2,3,4,9-tetrahydro-1H-pyrido[3,4-b]indole and phosphorus oxychloride according to H. Henecka et al. loc. cit. is introduced while stirring well and cooling in ice, into a mixture of 500 ccs. of ether and a solution of 15 g. of sodium hydroxide in 450 ccs. of water. The phases are separated when the complex has gone into solution, the aqueous phase being extracted once with ether. The combined ethereal phases are briefly dried over potassium carbonate and allowed to run at room temperature into a solution of 8.9 g. of 4-amino-3,5-dimethylpyrazole in 140 ccs. of dimethylsulfoxide, with stirring. The mixture is stirred for 1½ hours at room temperature and then 8 hours under reflux. After cooling, the solution is decanted from the precipitate, and the precipitate is distributed between dilute sodium hydroxide solution and a 1:1 mixture of benzene and n-butanol. The organic phase is dried over sodium sulfate and evaporated, the residue being recrystallized from ethanol-water. The product, 1-(3,5-dimethylpyrazol - 4 - ylamino)-4,9-dihydro-3H-pyrido[3,4-b]indole melts at 280–281° with decomposition. Yield: 13.7 g.

EXAMPLE 2

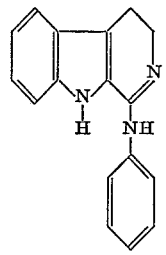

14.1 g. of the complex of 1-oxo-2,3,4,9-tetrahydro-1H-pyrido[3,4-b]indole and phosphorus oxychloride are slowly introduced into 80 ccs. of aniline at 30–35°, with stirring. The mixture is subsequently stirred for 3 hours at 40°, whereupon a clear solution is formed. After cooling, the reaction product is precipitated by adding ether and is filtered off and distributed between dilute sodium hydroxide solution and ether. The organic phase is dried over potassium carbonate, evaporated and freed of aniline at 100°/0.1 mm. Hg. The residue is taken up in dilute acetic acid, this mixture filtered, and the filtrate rendered alkaline with dilute sodium hydroxide solution. The product, 1 - anilino-4,9-dihydro-3H-pyrido[3,4-b]-indole is recrystallized from ethanol-water or benzene-ligroin and melts at 157.5–160°. Yield: 3.5 g.

EXAMPLE 3

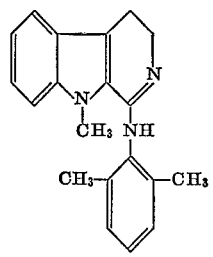

16 g. of 1-oxo-9-methyl-2,3,4,9-tetrahydro-1H-pyrido-[3,4,-b]indole and 80 ccs. of phosphorus oxychloride are heated for several minutes to 70–80° until a clear solution has been produced. The solution is then immediately cooled and precipitated with absolute ether. After some time the precipitate is filtered off, rinsed with absolute ether, and introduced into a mixture of 19.4 g. of 2,6-xylidine and 70 ccs. of absolute methanol. The whole is stirred for 8 hours under reflux and then evaporated to dryness. The residue is distributed between dilute sodium hydroxide solution and a 2:1 mixture of ether and methylene chloride. The organic phase is dried over potassium carbonate and evaporated to dryness, finally at 100°/0.1 mm. Hg. The residue is taken up in dilute acetic acid, the mixture filtered, and the filtrate rendered alkaline with dilute sodium hydroxide solution. The crude base is taken up in ether and the solution is dried over potassium carbonate and rendered acidic with hydrochloric acid in ether. The product, the hydrochloride of 1-(2,6-xylidino)-9 - methyl-4,9-dihydro-3H-pyrido[3,4-b]indole melts at 298° after recrystallization from methanol-ether. Yield: 4.8 g.

EXAMPLE 4

A mixture of 8.3 g. of 1-methoxy-4,9-dihydro-3H-pyrido[3,4-b]indole hydrochloride, 4.1 g. of 4-amino-3,5-dimethylpyrazole and 30 ccs. of dry dimethylsulfoxide is stirred for 3 hours at 120° and 1 hour at 130°. The mixture is combined with water after cooling, rendered alkaline with sodium hydroxide solution and extracted with a 1:1 mixture of benzene and n-butanol. The organic phase is dried over potassium carbonate and evaporated in vacuo. The crude product is taken up in dilute acetic acid, the solution filtered, and the filtrate rendered alkaline with dilute sodium hydroxide solution. Thereafter the product is filtered off and recrystallized from ethanol-water. The product, 1 - (3,5-dimethylpyrazol-4-ylamino)-4,9-dihydro-3H-pyrido[3,4-b]indole agrees, in all its properties, with the product produced in Example 1. Yield: 5.7 g.

EXAMPLE 5

A solution of 20.2 g. of 1-thiono-2,3,4,9-tetrahydro-1H-pyrido[3,4-b]indole in 300 ccs. of absolute dioxane is mixed with 16.0 g. of methyl iodide over the course of ½ hour. The mixture is stirred overnight at 40° and the product is filtered off after cooling. The product 1-methylmercapto - 4,9 - dihydro-3H-pyrido[3,4-b]indole hydriodide melts at 230–234° C., with decomposition, Yield: 27.0 g.

17.2 g. of this salt are stirred with 6.0 g. of 4-amino-3,5-dimethylpyrazole and 40 ccs. of dry dimethylsulfoxide for 3 hours at 120°. The cooled reaction mixture is diluted with water, rendered alkaline with sodium hydroxide solution and worked up as described in Example 4. The product, 1 - (3,5-dimethylpyrazol-4-ylamino)-4,9-dihydro-3H-pyrido[3,4-b]indole agrees, in all its properties, with the product produced in Example 1. Yield: 11.3 g.

EXAMPLE 6

The complex obtained from 15 g. of 1-oxo-2,3,4,9-tetrahydro - 1H - pyrido[3,4 - b]indole and phosgene in chloroform according to H. Henecka et al. loc. cit. is introduced into a solution of 18.0 g. of 4-amino-3,5-dimethylpyrazole in 250 ccs. of dry dimethylsulfoxide. The mixture is stirred for 1 hour at room temperature and 8 hours at 40–45°. After it has cooled, it is diluted with water, rendered alkaline with sodium hydroxide solution and worked up as described in Example 4. The product 1-(3,5-dimethylpyrazol-4-ylamino) - 4,9 - dihydro - 3H-pyrido[3,4-b]indole agrees in all its properties, with the product in Example 1. Yield: 11.5 g.

EXAMPLE 7

9.5 g. of triethyloxonium tetrafluoroborate are introduced, in small portions, into a suspension of 9.3 g. of 1-oxo-2,3,4,9-tetrahydro-1H-pyrido[3,4 - b]indole in 200 ccs. of dry methylene chloride, while stirring well and excluding moisture. The mixture is stirred for a further 5 hours at room temperature, 5.1 g. of aniline are subsequently added, and the whole is stirred overnight under reflux. After cooling, it is thoroughly shaken once with dilute sodium hydroxide solution and once with water, and the organic phase is dried over potassium carbonate and evaporated. The residue is taken up in dilute acetic acid, insoluble matter is filtered off, and the filtrate is rendered alkaline with sodium hydroxide solution. The 1-anilino-4,9-dihydro-3H-pyrido-3,4 - b]indole which precipitates is recrystallized from ethanol-water and agrees, in all properties, with the product manufactured according to Example 2. Yield: 6.9 g.

EXAMPLE 8

4.8 g. of tryptamine are dissolved in 50 ccs. of chloroform and treated with 3.6 g. of phenylisocyanate. The mixture is stirred for a further ½ hour under reflux and cooled, and 10 ccs. of phosphorus oxychloride are then added. Thereafter the whole is again stirred for 8 hours under reflux and evaporated to dryness. The residue is taken up in water, the mixture rendered alkaline with sodium hydroxide solution and extracted with a 2:1 mixture of ether and methylene chloride. The organic phase is dried over potassium carbonate and evaporated. The residue is taken up in dilute acetic acid, the mixture filtered and the filtrate rendered alkaline with sodium hydroxide solution. 1-anilino-4,9-dihydro-3H-pyrido[3,4-b] indole is recrystallized from ethanol-water, with addition of active charcoal, and agrees, in all its properties, with the product produced in Example 2. Yield: 1.4 g.

EXAMPLE 9

31.2 g. phosphorus oxychloride are added to a suspension of 37.2 g. 1-oxo-2,3,4,9-tetrahydro-1H-pyrido[3, 4-b] indole in 150 ccs. tetramethylenesulfone and heating to 60° C. is effected for some minutes. 22.6 g. 4-amino-3,5-dimethylpyrazole are then introduced at 25° C. and stirring is effected for 2½ hours at 50° C. After cooling, 2 liters of water are added with stirring. The solid which crystallizes is collected by suction filtration and boiled out with a little ethanol. The 1 - (3,5 - dimethylpyrazol - 4-ylamino)-4,9-dihydro-3H-pyrido[3,4-b]indole hydrochloride formed melts above 340° C. Yield: 52.4 g.

In accordance with the indicated procedure of the foregoing examples, the reactants set forth in Table 2 are utilized to yield the corresponding product set forth in Table 3:

TABLE 2

| Ex. | Procedure | Reactants |
|---|---|---|
| 10 | Example 1 | 2-toluidin plus 1-oxo-2,3,4,9-tetrahydro-1H-pyrido [3,4-b] indole. |
| 11 | do | 2,6-xylidon plus 1-oxo-2,3,4,9-tetrahydro-1H-pyrido [3,4-b] indole. |
| 12 | do | 4-chloranilin plus 1-oxo-2,3,4,9-tetrahydro-1H-pyrido [3,4-b] indole. |
| 13 | do | 4-aminopyrazol plus 1-oxo-2,3,4,9-tetrahydro-1H-pyrido [3,4-b] indole. |
| 14 | do | 4-amino-3-methyl-pyrazol plus 1-oxo-2,3,4,9-tetrahydro-1H-pyrido [3,4,b] indole. |
| 15 | do | 4-amino-3-ethyl-5-methyl-pyrazol plus 1-oxo-2,3,4,9-tetrahydro-1H-pyrido [3,4-b] indole. |
| 16 | do | 4-amino-3,5-dimethylpyrazol plus 1-oxo-2,3,4,9-tetrahydro-1H-pyrido [3,4-b] indole. |
| 17 | do | 5-amino-4-methyl-1-phenyl-pyrazol plus 1-oxo-2,3,4,9-tetrahydro-1H-pyrido [3,4,b] indole. |
| 18 | do | 4-amino-1,3,5-trimethyl-pyrazol plus 1-oxo-2,3,4,9-tetrahydro-1H-pyrido [3,4-b] indole. |
| 19 | do | 4-amino-3,5-dimethylisoxazol plus 1-oxo-2,3,4,9-tetrahydro-1H-pyrido [3,4-b] indole. |
| 20 | do | 4-amino-pyrazol plus 1-oxo-4-methyl-2,3,4,9-tetrahydro-1H-pyrido [3,4-b] indol. |
| 21 | do | 4-amino-3-methyl-pyrazol plus 1-oxo-4-methyl-2,3,4,9-tetrahydro-1H-pyrido [3,4-b] indol. |
| 22 | do | 4-amino-3,5-dimethyl-pyrazol plus 1-oxo-4-methyl-2,3,4,9-tetrahydro-1H-pyrido [3,4-b] indol. |
| 23 | do | 4-amino-3-ethyl-5-methyl-pyrazol plus 1-oxo-4-methyl-2,3,4,9-tetrahydro-1H-pyrido [3,4-b] indol. |
| 24 | do | 4-amino-3,5-diethyl-pyrazol plus 1-oxo-4-methyl-2,3,4,9-tetrahydro-1H-pyrido [3,4-b] indol. |
| 25 | do | 2,6-xylidin plus 1-oxo-6-methyl-2,3,4,9-tetrahydro-1H-pyrido [3,4-b] indol. |

TABLE 2—Continued

| Ex. | Procedure | Reactants |
|---|---|---|
| 26 | do | 4-amino-pyrazol plus 1-oxo-6-methyl-2,3,4,9-tetrahydro-1H-pyrido [3,4-b] indol. |
| 27 | do | 4-amino-3-methyl-pyrazol plus 1-oxo-6-methyl-2,3,4,9-tetrahydro-1H-pyrido [3,4-b] indol. |
| 28 | Example 1 or 9 | 4-amino-3,5-dimethyl-pyrazol plus 1-oxo-6-methyl-2,3,4,9-tetrahydro-1H-pyrido-[3,4-b] indol. |
| 29 | Example 1 | 4-amino-3-ethyl-5-methyl-pyrazol plus 1-oxo-6-methyl-2,3,4,9-tetrahydro-1H-pyrido-[3,4-b] indol. |
| 30 | do | 4-amino-3,5-diethyl-pyrazol plus 1-oxo-6-methyl-2,3,4,9-tetrahydro-1H-pyrido-[3,4-b] indol. |
| 31 | do | 4-amino-1,3,5-trimethylpyrazol plus 1-oxo-6-methyl-2,3,4,9-tetrahydro-1H-pyrido [3,4-b] indol. |
| 32 | do | 4-amino-3-methylpyrazol plus 1-oxo-8-methyl-2,3,4,9-tetrahydro 1H-pyrido-[3,4-b] indol. |
| 33 | do | 4-amino-3,5-dimethyl-pyrazol plus 1-oxo-8-methyl-2,3,4,9-tetrahydro-1H-pyrido-[3,4-b] indol. |
| 34 | do | 4-amino-3-ethyl-5-methyl-pyrazol plus 1-oxo-8-methyl-2,3,4,9-tetrahydro-1H-pyrido-[3,4-b] indol. |
| 35 | do | 4-amino-3,5-diethyl-pyrazol plus 1-oxo-8-methyl-2,3,4,9-tetrahydro-1H-pyrido-[3,4-b] indol. |
| 36 | do | Anilin plus 1-oxo-6-methoxy-2,3,4,9-tetrahydro-1H-pyrid-[3,4-b] indol. |
| 37 | do | 2-toluidin plus 1-oxo-6-methoxy-2,3,4-9-tetrahydro-1H-pyrid-[3,4-b] indol. |
| 38 | Example 1 or 2 | 2,6-xylidin plus 1-oxo-6-methoxy-2,3,4,9-tetrahydro-1H-pyrid-[3,4-b] indol. |
| 39 | Example 1 | 4-amino-pyrazol plus 1-oxo-6-methoxy-2,3,4,9-tetrahydro-1H-pyrid-[3,4-b] indol. |
| 40 | do | 4-amino-3-methyl-pyrazol plus 1-oxo-6-methoxy-2,3,4,9-tetrahydro-1H-pyrid [3,4-b]indol. |
| 41 | do | 4-amino-3,5-dimethylpyrazol plus 1-oxo-6-methoxy-2,3,4,9-tetrahydro-1H-pyrid-[3,4-b] indol. |
| 42 | do | 4-amino-3-ethyl-5-methyl-pyrazol plus 1-oxo-6-methoxy-2,3,4,9-tetrahydro-1H-pyrid-[3,4-b] indol. |
| 43 | do | 4-amino-3,5-diethylpyrazol plus 1-oxo-6-methoxy-2,3,4,9-tetrahydro-1H-pyrid-[3,4-b] indol. |
| 44 | do | 4-amino-1,3,5-trimethylpyrazol plus 1-oxo-6-methoxy-2,3,4,9-tetrahydro-1H-pyrid-[3,4-b] indol. |
| 45 | do | 5-amino-4-methyl-1-phenyl-pyrazol plus 1-oxo-6-methoxy-2,3,4,9-tetrahydro-1H-pyrid-[3,4-b] indol. |
| 46 | do | 4-amino-pyrazol plus 1-oxo-5,7-dimethyl-2,3,4,9-tetrahydro-1H-pyrid-[3,4-b] indol. |
| 47 | do | 4-amino-3-methylpyrazol plus 1-oxo-5,7-dimethyl-2,3,4,9-tetrahydro-1H-pyrid-[3,4-b] indol. |
| 48 | do | 4-amino-3,5-dimethylpyrazol plus 1-oxo-5,7-dimethyl-2,3,4,9-tetrahydro-1H-pyrid-[3,4-b] indol. |
| 49 | do | 4-amino-3-ethyl-5-methyl-pyrazol plus 1-oxo-5,7-dimethyl-2,3,4,9-tetrahydro-1H-pyrid-[3,4-b] indol. |
| 50 | do | 4-amino-3,5-diethyl-pyrazol plus 1-oxo-5,7-dimethyl-2,3,4,9-tetrahydro-1H-pyrid-[3,4-b] indol. |
| 51 | do | 4-amino-pyrazol plus 1-oxo-6,8-dimethyl-2,3,4,9-tetrahydro-1H-pyrid [3,4-b] indol. |
| 52 | do | 4-amino-3-methylpyrazol plus 1-oxo-6,8-dimethyl-2,3,4,9-tetrahydro-1H-pyrid-[3,4-b] indol. |
| 53 | do | 4-amino-3,5-dimethylpyrazol plus 1-oxo-6,8-dimethyl-2,3,4,9-tetrahydro-1H-pyrid-[3,4-b] indol. |
| 54 | do | 4-amino-3-ethyl-5-methyl-pyrazol plus 1-oxo-6,8-dimethyl-2,3,4,9-tetrahydro-1H-pyrid-[3,4-b] indol. |
| 55 | do | 4-amino-3,5-diethylpyrazol plus 1-oxo-6,8-dimethyl-2,3,4,9-tetrahydro-1H-pyrid [3,4-b] indol. |
| 56 | do | 2,6-xylidin plus 1,6-dimethoxy-9-methyl-4,9-dihydro-3H-pyrido-[3,4-b] indol. |
| 57 | do | 2,6-xylidin plus 1-oxo-6-chloro-2,3,4,9-tetrahydro-1H-pyrido-[3,4-b] indol. |
| 58 | do | 2-amino-3-methyl-pyridin plus 1-oxo-2,3,4,9-tetrahydro-1H-pyrido-[3,4-b] indol. |

TABLE 3

| Ex. | Compound | Melting point, °C. |
|---|---|---|
| 10 | 1-(2-toluidino)-4, 9-dihydro-3H-pyrido[3, 4-b]indole | 184–187 |
| 11 | 1-(2, 6-xylidino)-4, 9-dihydro-3H-pyrido[3, 4-b]indole | 179.5–182 |
| 12 | 1-(4-chloroanilino)-4, 9-dihydro-3H-pyrido[3, 4-b] indole. | 197–199 |
| 13 | 1-(pyrazol-4-ylamino)-4, 9-dihydro-3H-pyrido[3, 4-b] indole. | 220–222 |
| 14 | 1-(3-methylpyrazol-4-ylamino)-4, 9-dihydro-3H-pyrido[3,4-b]indole. | 244–246 |
| 15 | 1-(3-ethyl-5-methylpyrazol-4-ylamino)-4, 9-dihydro-3H-pyrido[3, 4-b]-indole. | 204–208 |
| 16 | 1-(3, 5-diethylpyrazol-4-ylamino)-4, 9-dihydro-3H-pyrido[3, 4-b]indole. | [1] 258–260 |
| 17 | 1-(4-methyl-1-phenylpyrazol-5-ylamino)-4, 9-dihydro-3H-pyrido[3, 4-b]indole. | 175–178 |
| 18 | 1-(1, 3, 5-trimethylpyrazol-4-ylamino)-4, 9-dihydro-3H-pyrido[3,4-b]indole. | 235–237 |
| 19 | 1-(3, 5-dimethylisoxazol-4-ylamino)-4, 9-dihydro-3H-pyrido[3, 4-b]indole. | [1] 224–225 |
| 20 | 1-(pyrazol-4-ylamino)-4-methyl-4, 9-dihydro-3H-pyrido[3, 4-b]indole. | [1] 256–258 |
| 21 | 1-(3-methylpyrazol-4-ylamino)-4-methyl-4, 9-dihydro-3H-pyrido[3, 4-b]indole. | [1] 233–235 |
| 22 | 1-(3, 5-dimethylpyrazol-4-ylamino)-4-methyl-4, 9-dihydro-3H-pyrido[3, 4-b]indole. | [1] 279–281 |
| 23 | 1-(3-ethyl-5-methylpyrazol-4-ylamino)-4-methyl-4, 9-dihydro-3H-pyrido[3, 4-b]indole. | [1] 205–207 |
| 24 | 1-(3, 5-diethylpyrazol-4-ylamino)-4-methyl-4, 9-dihydro-3H-pyrido[3, 4-b]indole. | 226–229 |
| 25 | 1-(2, 6-xylidino)-6-methyl-4, 9-dihydro-3H-pyrido-[3, 4-b]indole. | 126–128 |
| 26 | 1-(pyrazol-4-ylamino)-6-methyl-4, 9-dihydro-3H-pyrido[3, 4-b]indole. | 255–257 |
| 27 | 1-(3-methylpyrazol-4-ylamino)-6-methyl-4, 9-dihydro-3H-pyrido[3, 4-b]indole. | [1] 272–275 |
| 28 | 1-(3, 5-dimethylpyrazol-4-ylamino)-6-methyl-4, 9-dihydro-3H-pyrido[3, 4-b]indole-HCL. | >300 |
| 29 | 1-(3-ethyl-5-methylpyrazol-4-ylamino)-6-methyl-4, 9-dihydro-3H-pyrido[3, 4-b]indole. | [1] 245–247 |
| 30 | 1-(3, 5-diethylpyrazol-4-ylamino)-6-methyl-4, 9-dihydro-3H-pyrido[3, 4-b]indole. | 243–245 |
| 31 | 1-(1, 3, 5-trimethylpyrazol-4-ylamino)-6-methyl-4, 9-dihydro-3H-pyrido[3, 4-b]indole. | [1] 236–239 |
| 32 | 1-(3-methylpyrazol-4-ylamino)-8-methyl-4, 9-dihydro-3H-pyrido[3, 4-b]indole. | [1] 283–285 |
| 33 | 1-(3, 5-dimethylpyrazol-4-ylamino)-8-methyl-4, 9-dihydro-3H-pyrido[3, 4-b]indole. | [1] 320–323 |
| 34 | 1-(3-ethyl-5-methylpyrazol-4-ylamino)-8-methyl-4, 9-dihydro-3H-pyrido[3, 4-b]indole. | [1] 254–256 |
| 35 | 1-(3, 5-diethylpyrazol-4-ylamino)-8-methyl-4, 9-dihydro-3H-pyrido[3, 4-b]indole. | 195–197 |
| 36 | 1-anilino-6-methoxy-4, 9-dihydro-3H-pyrido[3, 4-b] indole. | [1] 187–189 |
| 37 | 1-(2-toluidino)-6-methoxy-4, 9-dihydro-3H-pyrido-[3, 4-b]indole. | 158.5–160 |
| 38 | 1-(2, 6-xylidino)-6-methoxy-4, 9-dihydro-3H-pyrido-[3, 4-b]indole. | 177.5–178 |
| 39 | 1-(pyrazol-4-ylamino)-6-methoxy-4, 9-dihydro-3H-pyrido[3, 4-b]indole. | 252–253 |
| 40 | 1-(3-methylpyrazol-4-ylamino)-6-methoxy-4, 9-dihydro-3H-pyrido[3, 4-b]indole. | [1] 238–240 |
| 41 | 1-(3, 5-dimethylpyrazol-4-ylamino)-6-methoxy-4, 9-dihydro-3H-pyrido[3, 4-b]indole. | [1] 288–289 |
| 42 | 1-(3-ethyl-5-methylpyrazol-4-ylamino)-6-methoxy-4, 9-dihydro-3H-pyrido[3, 4-b]indole. | 240–242 |
| 43 | 1-(3, 5-diethylpyrazol-4-ylamino)-6-methoxy-4, 9-dihydro-3H-pyrido[3, 4-b]indole. | [1] 255–256 |
| 44 | 1-(1, 3, 5-trimethylpyrazol-3-ylamino)-6-methoxy-4, 9-dihydro-3H-pyrido[3, 4-b]indole. | [1] 250–251.5 |
| 45 | 1-(4-methyl-1-phenylpyrazol-5-ylamino)-6-methoxy-4, 9-dihydro-3H-pyrido[3, 4-b]indole. | 208–209.5 |
| 46 | 1-(pyrazol-4-ylamino)-5, 7-dimethyl-4, 9-dihydro-3H-pyrido[3, 4-b]indole. | [1] 255–258 |
| 47 | 1-(3-methylpyrazol-4-ylamino)-5, 7-dimethyl-4, 9-dihydro-3H-pyrido[3, 4-b]indole. | [1] 248–250 |
| 48 | 1-(3, 5-dimethylpyrazol-4-ylamino)-5, 7-dimethyl-4, 9-dihydro-3H-pyrido[3, 4-b]indole. | >300 |
| 49 | 1-(3-ethyl-5-methylpyrazol-4-ylamino)-5, 7-dimethyl-4, 9-dihydro-3H-pyrido[3, 4-b]indole. | [1] 287–289 |
| 50 | 1-(3, 5-diethylpyrazol-4-ylamino)-5, 7-dimethyl-4, 9-dihydro-3H-pyrido[3, 4-b]indole. | [1] 262–263 |
| 51 | 1-(pyrazol-4-ylamino)-6, 8-dimethyl-4, 9-dihydro-3H-pyrido[3, 4-b]indole. | [1] 300–305 |
| 52 | 1-(3-methylpyrazol-4-ylamino)-6, 8-dimethyl-4, 9-dihydro-3H-pyrido[3, 4-b]indole. | [1] 300–305 |
| 53 | 1-(3, 5-dimethylpyrazol-4-ylamino)-6, 8-dimethyl-4, 9-dihydro-3H-pyrido[3, 4-b]indole. | [1] 315–320 |
| 54 | 1-(3-ethyl-5-methylpyrazol-4-ylamino)-6, 8-dimethyl-4, 9-dihydro-3H-pyrido[3, 4-b]indole. | [1] 259–263 |
| 55 | 1-(3, 5-diethylpyrazol-4-ylamino)-6, 8-dimethyl-4, 9-dihydro-3H-pyrido[3, 4-b]indole. | [1] 272–274 |
| 56 | 1-(2, 6-xylidino)-6-methoxy-9-methyl-4, 9-dihydro-3H-pyrido[3, 4-b]indole. | 144–145 |
| 57 | 1-(2, 6-xylidino)-6-chloro-4, 9-dihydro-3H-pyrido-[3, 4-b]indole. | 196–197 |
| 58 | 1-(3-methylpyrid-2-ylamino)-4, 9-dihydro-3H-pyrido[3, 4-b]indole. | [1] 177–182 |

[1] Decomposition.

The relationship of the embodiments of Examples 10 through 58, as shown in Table 3, to Formula I can be seen in Table 4.

TABLE 4

| Example | R¹ | R² | R³ | R⁴ | R⁵ | R⁶ | R⁷ |
|---|---|---|---|---|---|---|---|
| 10 | 2-tolyl | H | H | H | H | H | H |
| 11 | 2,6-xylyl | H | H | H | H | H | H |
| 12 | 4-chlorophenyl | H | H | H | H | H | H |
| 13 | Pyrazolyl-(4) | H | H | H | H | H | H |
| 14 | 3(5)-methylpyrazolyl-(4) | H | H | H | H | H | H |
| 15 | 3(5)-ethyl-5(3)-methylpyrazolyl-(4) | H | H | H | H | H | H |
| 16 | 3,5-diethylpyrazolyl-(4) | H | H | H | H | H | H |
| 17 | 4-methyl-1-phenylpyrazolyl-(5) | H | H | H | H | H | H |
| 18 | 1,3,5-trimethylpyrazolyl-(4) | H | H | H | H | H | H |
| 19 | 3,5-dimethylisoxazolyl-(4) | H | H | H | H | H | H |
| 20 | Pyrazolyl-(4) | CH₃ | H | H | H | H | H |
| 21 | 3(5)-methylpyrazolyl-(4) | CH₃ | H | H | H | H | H |
| 22 | 3,5-dimethylpyrazolyl-(4) | CH₃ | H | H | H | H | H |
| 23 | 3(5)-ethyl-5(3)-methylpyrazolyl-(4) | CH₃ | H | H | H | H | H |
| 24 | 3,5-diethylpyrazolyl-(4) | CH₃ | H | H | H | H | H |
| 25 | 2,6-xylyl | H | H | CH₃ | H | H | H |
| 26 | Pyrazolyl-(4) | H | H | CH₃ | H | H | H |
| 27 | 3(5)-methylpyrazolyl-(4) | H | H | CH₃ | H | H | H |
| 28 | 3,5-dimethylpyrazolyl-(4) (hydrochloride) | H | H | CH₃ | H | H | H |
| 29 | 3(5)-ethyl-5(3)-methylpyrazolyl-(4) | H | H | CH₃ | H | H | H |
| 30 | 3,5-diethylpyrazolyl-(4) | H | H | CH₃ | H | H | H |
| 31 | 1,3,5-trimethylpyrazolyl-(4) | H | H | CH₃ | H | H | H |
| 32 | 3(5)-methylpyrazolyl-(4) | H | H | H | H | CH₃ | H |
| 33 | 3,5-dimethylpyrazolyl-(4) | H | H | H | H | CH₃ | H |
| 34 | 3(5)-ethyl-5(3)-methylpyrazolyl-(4) | H | H | H | H | CH₃ | H |
| 35 | 3,5-diethylpyrazolyl-(4) | H | H | H | H | CH₃ | H |
| 36 | Phenyl | H | H | CH₃O | H | H | H |
| 37 | 2-tolyl | H | H | CH₃O | H | H | H |
| 38 | 2,6-xylyl | H | H | CH₃O | H | H | H |
| 39 | Pyrazolyl-4 | H | H | CH₃O | H | H | H |
| 40 | 3(5)-methylpyrazolyl-(4) | H | H | CH₃O | H | H | H |
| 41 | 3,5-dimethylpyrazolyl-(4) | H | H | CH₃O | H | H | H |
| 42 | 3(5)-ethyl-5(3)-methylpyrazolyl-(4) | H | H | CH₃O | H | H | H |
| 43 | 3,5-diethylpyrazolyl-(4) | H | H | CH₃O | H | H | H |
| 44 | 1,3,5-trimethylpyrazolyl-(4) | H | H | CH₃O | H | H | H |
| 45 | 4-methyl-1-phenylpyrazolyl-(5) | H | H | CH₃O | H | H | H |
| 46 | Pyrazolyl-(4) | H | CH₃ | H | CH₃ | H | H |
| 47 | 3(5)-methylpyrazolyl-(4) | H | CH₃ | H | CH₃ | H | H |
| 48 | 3,5-dimethylpyrazolyl-(4) | H | CH₃ | H | CH₃ | H | H |
| 49 | 3(5)-ethyl-5(3)-methylpyrazolyl-(4) | H | CH₃ | H | CH₃ | H | H |
| 50 | 3,5-diethylpyrazolyl-(4) | H | CH₃ | H | CH₃ | H | H |
| 51 | Pyrazolyl-(4) | H | H | CH₃ | H | CH₃ | H |
| 52 | 3(5)-methylpyrazolyl-(4) | H | H | CH₃ | H | CH₃ | H |
| 53 | 3,5-dimethylpyrazolyl-(4) | H | H | CH₃ | H | CH₃ | H |
| 54 | 3(5)-ethyl-5(3)-methylpyrazolyl-(4) | H | H | CH₃ | H | CH₃ | H |
| 55 | 3,5-diethylpyrazolyl-(4) | H | H | CH₃ | H | CH₃ | H |
| 56 | 2,6-xylyl | H | H | CH₃O | H | H | CH₃ |
| 57 | 2,6-xylyl | H | H | Cl | H | H | H |
| 58 | 3-methylpyridyl-(2) | H | H | H | H | H | H |

What is claimed is:

1. A compound of the formula:

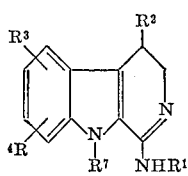

wherein

R¹ is a phenyl, phenyl substituted by one or two members selected from the group consisting of lower alkyl and halogen, pyridyl, pyridyl substituted by lower alkyl, pyrazolyl, pyrazolyl substituted by one to three lower alkyl groups, isoxazolyl, or isoxazolyl substituted by one or two lower alkyl groups;

R² is hydrogen, methyl or ethyl;

each of R³ and R⁴ independent of the other, is hydrogen, lower alkyl, lower alkoxy, lower alkyl mercapto or halogeno; and R⁷ is hydrogen or lower alkyl, or a pharmaceutically acceptable acid addition salt thereof.

2. A compound as defined in claim 1 wherein R¹ is pyrazolyl, pyrazolyl substituted with from one to three lower alkyl groups, isoxazolyl or isoxazolyl substituted with one or two lower alkyl groups.

3. A compound as defined in claim 1 wherein R¹ is pyridyl, pyridyl substituted by lower alkyl, phenyl, or phenyl substituted with one or two lower alkyl or halogeno groups.

4. A compound as defined in claim 1 wherein
R¹ is pyridyl, methylpyridyl, phenyl, chlorophenyl, tolyl, xylyl, 3,5-di(lower alkyl)isoxazolyl, pyrazolyl, or pyrazolyl substituted with from one to three lower alkyl groups;
R² is hydrogen or methyl;
each of R³ and R⁴ is hydrogen, methyl, methoxy or chloro; and
R⁷ is hydrogen or methyl
or a pharmaceutically acceptable acid addition salt thereof.

5. The compound as defined in claim 1 which is 1-(3,5-dimethylpyrazol - 4 - ylamino) - 4,9 - dihydro-3H-pyrido [3,4-b]indole.

6. The compound as defined in claim 1 which is 1-(3,5-diethylpyrazol - 4 - ylamino) - 4,9 - dihydro-3H-pyrido [3,4-b]indole.

7. The compound as defined in claim 1 which is 1 - (3-ethyl - 5 - methylpyrazol - 4 - ylamino) - 4,9 - dihydro-3H-pyrido[3,4-b]indole.

8. The compound as defined in claim 1 which is 1-(2,6-xylidino) - 6 - methoxy - 4,9 - dihydro - 3H - pyrido [3,4-b]indole.

9. The compound as defined in claim 1 which is 1-(3,5-dimethylpyrazol - 4 - ylamino) - 6 - methyl - 4,9 - dihydro-3H-pyrido[3,4-b]indole.

10. The compound as defined in claim 1 which is 1-(1,3,5-trimethylpyrazol-4-ylamino)-6-methyl - 4,9 - dihydro-3H-pyrido[3,4-b]indole.

11. The compound as defined in claim 1 which is 1-(3-ethyl - 5 - methylpyrazol - 4 - ylamino) - 6 - methyl-4,9-dihydro-3H-pyrido[3,4-b]indole.

12. The compound as defined in claim 1 which is 1-(3,5-dimethylpyrazol - 4 - ylamino) - 4 - methyl - 4,9 - dihydro-3H-pyrido[3,4-b]indole.

13. The compound as defined in claim 1 which is 1-(3-ethyl - 5 - methylpyrazol - 4 - ylamino) - 4 - methyl - 4,9-dihydro-3H-pyrido[3,4-b]indole.

14. The compound as defined in claim 1 which is 1-(2,6-xylidino)-9-methyl - 4,9 - dihydro - 3H - pyrido[3,4-b]indole.

15. The compound as defined in claim 1 which is 1-anilino-4,9-dihydro-3H-pyrido[3,4-b]indole.

References Cited

Roberts et al., Basic Principles of Organic Chemistry, Benjamin Pubishers, p. 806 (1965).

ALAN L. ROTMAN, Primary Examiner

U.S. Cl. X.R.

260—294.8 B, 295 T, 326.12, 326.13 R; 424—263